United States Patent [19]

Browning

[11] 3,983,200

[45] Sept. 28, 1976

[54] METHOD FOR THE PRODUCTION OF POLYTETRAFLUOROETHYLENE MOULDING POWDERS

[75] Inventor: Howard Edmund Browning, Welwyn, England

[73] Assignee: Imperial Chemical Industries Limited, London, England

[22] Filed: May 28, 1974

[21] Appl. No.: 473,913

Related U.S. Application Data

[63] Continuation of Ser. No. 205,657, Dec. 7, 1971, abandoned.

[30] Foreign Application Priority Data

Dec. 11, 1970 United Kingdom............... 59016/70
July 26, 1971 United Kingdom............... 34950/71

[52] U.S. Cl.............................. 264/117; 264/122; 264/127
[51] Int. Cl.² ........................................... B01J 2/10
[58] Field of Search..................... 264/117, 127, 122

[56] References Cited

UNITED STATES PATENTS 3,265,679   8/1966   Black et al. ....................... 264/117

OTHER PUBLICATIONS

Hackh's Chemical dictionary, 4th Ed., Julius Grant, 1969, p. 25.
Chemical Engineering Magazine, Dec. 4, 1967, McGraw–Hill Co. pp. 161–166.

*Primary Examiner*—Robert F. White
*Assistant Examiner*—James R. Hall
*Attorney, Agent, or Firm*—Cushman, Darby & Cushman

[57] ABSTRACT

Finely divided granular polytetrafluoroethylene powders are agglomerated by mechanically agitating them while the PTFE is wetted with an aqueous solution containing a protective colloid.

9 Claims, No Drawings

METHOD FOR THE PRODUCTION OF POLYTETRAFLUOROETHYLENE MOULDING POWDERS

This is a continuation of application Ser. No. 205,657 filed Dec. 7, 1971, now abandoned.

This invention relates to a method for the production of filled and unfilled moulding powders of polytetrafluoroethylene, hereinafter referred to as PTFE, moulding powders and in particular to a method for the production of free-flowing granular PTFE moulding powders.

Such granular polymers of high molecular weight are generally manufactured by polymerisation of tetrafluoroethylene in aqueous medium essentially in the absence of any surfactant.

In order to improve the physical properties of articles made from such granular polymers, the polymer is disintegrated after polymerisation. The best physical properties are obtained when the polymer has been disintegrated to a very small size, for example, to an air sedimentation size, as hereinafter defined, of less than 100 $\mu$m, especially less than 30 $\mu$m. Such a disintegration process is described in, inter alia, British Pat. No. 853,338. Air sedimentation size is defined as the average particle size diameter $d_{50}$ in microns determined by measuring the air sedimentation rate of a representative sample of the PTFE powder using air sedimentation apparatus of the type, and following the procedures described in U.S. Pat. No. 2,597,899 using a column providing a free fall distance of eight feet (2.44 m). As described in that patent, from the observed air sedimentation rate, the particle size distribution is determined by calculation from Stokes' law relating particle size to rate of fall. From a plot of the particle size distribution thus determined (i.e. a plot of cumulative weight percent of material against particle diameter $d$) the average particle size is taken as the particle diameter at 50 wt. % ($d_{50}$) on the distribution curve. Apparatus for performing air sedimentation particle size determinations by the techniques described in U.S. Pat. No. 2,597,899 is commercially available from the Franklin Electronics Corporation under the trade name "Micromerograph."

However, such finely disintegrated polymer powders have very poor powder-flow properties and a low bulk density. These two disadvantages render the polymer unsuitable for use in automatic moulding machines and so it is desirable to improve the bulk density and powder-flow properties.

Desirably a PTFE moulding powder should have a compacted flow rating of at least 16 and a compaction ratio of less than 4.3. Compacted flow rating, which is a measure of the flow properties of PTFE powder after being subjected to compacting conditions is determined according to the following procedure. A 5-inch (12.7 cm) high by 2-inch (5.08 cm) square hopper is filled with a sample of the resin to be tested. The bottom of the hopper consists of a removable screen with a slide valve directly beneath which when opened exposes the entire 2 × 2 inches (5.08 × 5.08 cm) screen area. Screens are provided having 1, 4, 9, 16, 25, 36, etc., openings per square inch (6.45 cm²) corresponding to 1, 2, 3, 4, 5, 6, etc., meshes per lineal inch (2.54 cm). To carry out the test, the hopper is filled with uncompacted powder while the slide valve is closed. The hopper is subjected to vibrations for a period of one minute at a frequency of 60 cycles per second and at an amplitude of approximately 1/16 inch (0.16 cm) in order to compact the powder. The slide valve is then opened and with the hopper still vibrating at the same frequency and amplitude, it is observed whether powder flows through the screen. If powder flows through the screen, then the hopper is recharged with fresh powder, a smaller screen size is inserted, and the test repeated to determine whether the powder flows through the finer screen. The uncompacted flow rating is the number of openings per square inch (6.45 cm²) of the finest screen through which flow is observed. The higher numbers, accordingly, indicate better flow characteristics.

Compaction ratio is related to the bulk density of the powder in the following manner:

$$\text{Compaction Ratio} = \frac{\text{True density}}{\text{Bulk density}}$$

For unfilled PTFE of which the true density is 2.15 g cm$^{-3}$ $$\text{Compaction Ratio} = \frac{2.15 \times 1000}{\text{Bulk density}}$$

where bulk density is expressed as g l$^{-1}$. Thus a compaction ratio of less than 4.3 corresponds, for unfilled PTFE, to a bulk density of more than 500 g l$^{-1}$.

For a filled PTFE in which the weight percentage of PTFE in the powder composition is x and the weight percentage of a filler of density $\rho$g cm$^{-3}$ is 100−x, then the true density, $\alpha$, expressed in g cm$^{-3}$, of the composition (which is the density of an article moulded from the composition) is given by the formula:

$$\alpha = \frac{216\rho}{\rho x + 2.15(100-x)}$$

The powder flow and compaction ratio of the finely disintegrated powders may be improved by subjecting the finely divided polymer powder to an agglomeration process. The aim of such a process is to cause the finely divided particles to adhere together to form agglomerates which exhibit good powder-flow properties and which also have a low compaction ratio but which can be broken down upon moulding of the polymer powder so that the good mechanical properties given by the use of finely disintegrated material are retained.

Various methods have been proposed for effecting such agglomeration. One method of agglomeration is described in United Kingdom Patent Specification No. 1,076,642 wherein the polymer powder is wetted with a minor amount of liquid having a low surface tension and the wetted powder is formed into agglomerates by, for example, a tumbling operation. After formation of the agglomerates, the liquid is removed by heating. However, the liquids used in that process are generally volatile organic materials and the heating operation gives rise to flammability or toxicity problems. In addition it would be desirable to use cheaper liquids than the aforesaid organic liquids.

According to this invention there is provided a process for the preparation of a free-flowing filled or unfilled granular PTFE moulding powder which comprises the steps of wetting a fine particle size poorly-flowing filled or unfilled granular PTFE powder wherein the PTFE particles have an air sedimentation size of less than 100 $\mu$m with an aqueous solution of a protective colloid, mechanically forming the wet filled or unfilled powder into filled or unfilled agglomerates respectively, and drying the agglomerates, the mechanical forming being conducted at a temperature and for a time to obtain a moulding powder which when dry has a compacted flow rating of at least 16 and a compaction ratio of less than 4.3. By filled agglomerates there is meant agglomerates of PTFE of which a substantial proportion contain filler material. The solution of the protective colloid may contain 10 to 10000, preferably 500 to 5000 parts by weight of the protective colloid per million parts by weight of water, and the amount of the solution used may be from $21.5/\alpha$ ml to $215/\alpha$ ml per 100 g of powder, where as above defined $\alpha$ is the true density, in g cm$^{-3}$ of the powder. The temperature at which the agglomeration is performed may be from 10° to 50°C.

Generally it is desirable that at least 50% by weight of the dried agglomerates have a size, as measured by dry sieving, in the range 150 to 2000 μm. By dry sieve size, or size as measured by dry sieving, we mean the average particle size diameter in microns determined by the following dry sieving technique: a series of U.S. Standard Sieve Series, eight inches (20.32 cm) in diameter, numbers 10, 18, 25, 40 and 60 are employed stacked on one another in order, from top to bottom, of decreasing sieve opening size. A sample of the agglomerated powder 50 grams in size is placed on the top sieve and the stack is gently shaken and tapped for about 1 minute to shake down the smaller particles. The topmost sieve (No. 10) is removed and the stack is again shaken about 1 minute after which the top sieve (No. 18) is removed and the stack is again shaken and tapped and so on until the powder has been fractioned between the 5 sieves. The weight of sample on each sieve is determined and from this data the particle size distribution curve is drawn by plotting the cumulative percent of sample on each sieve versus the average opening size of the respective sieves. The dry sieve particle size is taken as the particle diameter at 50 wt. % on the particle size distribution curve thus determined.

By the term protective colloid we mean those materials having a long molecular chain with hydrophilic portions distributed along the chain and having no discrete hydrophobic portion. In contrast those materials known as non-ionic surfactants such as condensates of ethylene oxide and long chain alcohols or phenols have a molecular structure of a hydrophilic portion at one end of the molecule and a hydrophobic portion at the other end of the molecule. The use of aqueous non-ionic surfactant solutions as agglomerating liquids is described in U.S. application of Banham and Browning, Ser. No. 205,656, filed Dec. 7, 1971, now abandoned, a counterpart of which has been published as German Pat. application P 21 61 857.5.

Examples of suitable protective colloids are gelatin, partially hydrolysed polyvinyl acetate, hydroxy methyl cellulose, hydroxyethyl cellulose, polyethylene oxides, starch, and styrene/maleic anhydride copolymers.

The amount of protective colloid used should be from 10 to 10000 parts by weight per million parts by weight (ppm) of water. Preferred amounts of protective colloid are 500 to 5000 ppm of water. Desirably the amount of protective colloid used will be kept as low as possible to avoid the formation of voids during sintering of blocks moulded from the agglomerated polymer and to minimize discolouration which may occur on heat treatment.

The amount of aqueous surfactant solution used is preferably within the range $65/\alpha$ ml to $130/\alpha$ ml, particularly $75/\alpha$ ml to $110/\alpha$ ml per 100 g of powder being agglomerated where $\alpha$ is the true density of the composition in g cm$^{-3}$. For unfilled powder compositions, this corresponds to a preferred range of approximately 30 to 60, particularly 35 to 50, ml per 100 g of PTFE.

To effect the agglomeration, the powder in admixture with the aqueous protective colloid solution is subjected to the mechanical blending operation which causes the resin particles to clump together. Preferably, the aqueous protective colloid solution is added to the powder while the powder is tumbled in a blender. A preferred form of apparatus for conducting the agglomeration process is a Y-blender provided with a liquid dispersion and cutter device, through which the aqueous protective colloid solution may be sprayed into the powder as it is tumbled in the blender.

The temperature at which the blending is performed affects the degree of agglomeration. The higher the temperature, the more readily will the particles agglomerate. As the blending temperature is increased, in addition to the readiness with which the particles agglomerate, the agglomerates become harder, and so are less readily broken down in transportation.

On the other hand use of higher temperatures can have an adverse effect on the physical properties e.g. tensile properties of sintered mouldings made from the agglomerated particles.

We have found that for unfilled PTFE compositions, and compositions containing a relatively small proportion of the filler of relatively low density, the blending should be conducted with the polymer preferably at a temperature from 10° to 40°C. Generally there is little point in agglomeration at temperatures below 0°c, as at such temperatures there is the risk of freezing the surfactant solution. The above temperatures are generally suitable for compositions containing less than 30% by volume of fillers of density of less than 4 g cm$^{-3}$.

Where dense fillers and/or large volumes of filler are used, stronger agglomerates are necessary as in some cases the larger agglomerates tend to act as the balls of a ball mill during the blending operation and cause the smaller agglomerates formed to break down again. In other cases the filled compositions just will not agglomerate readily at such temperatures. We have found that compositions containing large amounts, for example greater than 30% by volume, of filler and/or dense fillers, for example those fillers having densities greater than 4 g cm$^{-3}$, can be made into satisfactory agglomerates at higher temperatures; the more the filler used and/or the denser the filler, then the higher the optimum temperatures.

For example a PTFE composition containing 60% by weight of bronze of density about 9 i.e. about 27% by volume showed virtually no tendency to form agglomerates at a temperature of 0°C. At 20°C the agglomerates formed were very fragile and poorly formed. At a temperature of 40°C, however, good agglomerates were obtained. Similar results were obtained when using a PTFE composition containing 40% by volume of a mixture of graphite and bronze.

Simple experimentation will determine the optimum agglomeration temperature, whether the PTFE is filled or unfilled. It will, however, be clear to those skilled in the art that there may be filled materials which by reason of the large proportion or large size of the filler cannot be satisfactorily agglomerated and it is not intended that the process of the invention should be applied to such materials.

After drying the agglomerated powder, for example by heating at a temperature in the range 120° to 200°c, agglomerates of a certain size range can if desired be selected by sieving the powder through a mesh or meshes of the appropriate size. It is thus possible to remove particles in excess of, for example 2000 μm, and also to remove fines, and these oversized and undersized agglomerates can be recycled e.g. by feeding them together with virgin polymer to the Y-blender, and disintegrating the agglomerates and mixing them with the virgin polymer using the cutter device before adding the agglomerating liquid.

The agglomeration process can be continued for sufficient time so that a large proportion, for example at least 80% by weight of all the agglomerates have a size in the range 150 μm to 2000 μm as measured by dry sieving. Increasing the agglomeration time of course gives rise to more agglomerates of larger sizes.

In addition to forming agglomerates of PTFE, the invention is of particular use in formation of agglomerates of PTFE with fillers such as glass, graphite, coke powder, bronze and polymeric fillers such as polyimides. The proportion of filler in the filled composition is normally such that the final moulding of PTFE contains from 5 to 40% by volume of filler.

The invention is illustrated by the following Examples.

In the Examples, a commerically available unfilled granular PTFE moulding powder having a dry sieve size as previously defined of 300 to 350 μm was disintegrated by means of a mill to particles having an air sedimentation size of 20 μm.

EXAMPLE 1

62.5 parts by weight of the finely milled PTFE powder, to which 22.5 parts weight of finely divided graphite had been mixed, were blended at 20°C in a conventional liquid-solids Y-blender with 35 parts by weight of an aqueous solution of a partially hydrolysed polyvinyl acetate (degree of hydrolysis 72.5% by weight). The aqueous solution contained 500 parts by weight of the partially hydrolysed polyvinyl acetate per million parts by weight of water. No free water could be seen, and it was therefore assumed that the polymer was wetted by the solution. After tumbling for 60 minutes, the mixture was removed from the blender and dried for 16 hours at 120°C. After sieving through a B.S. 16 mesh sieve (which has an aperture size of about 1000 μm) on which 22% by weight of the product was retained, the fraction passing through the sieve had a compaction ratio of 3.21, a weight average particle size of 424 μm, as measured by dry sieving, and a compacted flow rating of 25.

The material retained on the sieve was suitable for mixing with a further blend of the milled PTFE powder and finely divided graphite and tumbling dry in the Y-blender to disintegrate the agglomerates. This mixture could then be agglomerated as described above.

The product passing through the sieve could be moulded easily by an automatic preforming machine and, on sintering preforms made thereby, gave satisfactory void free mouldings.

EXAMPLE 2

Example 1 was repeated using an alternative protective colloid solution containing 800 parts by weight per million parts by weight of water of a partially hydrolysed polyvinyl acetate having a degree of hydrolysis of 88% by weight. On sieving 20.5% by weight was retained on the B.S. 16 mesh sieve and the fraction passing through the sieve had a compaction ratio of 3.06, a weight average particle size of 480 μm, as measured by dry sieving, and a compacted flow rating of 36.

EXAMPLE 3

Examples 3 and 4 show the benefit from agglomerating a mixture containing a large volume of a dense filler at temperatures above ambient.

68 parts by weight of the finely-milled PTFE powder, to which 102 parts by weight of the finely-divided bronze had been mixed, were blended at 20°C using the procedure of Example 1, with 40 parts by weight of an aqueous solution containing 0.2% by weight of a partially hydrolysed polyvinyl acetate having a degree of hydrolysis of 88% by weight. After 30 minutes tumbling, the mixture was removed from the blender and dried for 16 hours at 120°C. The product was sieved through a B.S. 16 mesh sieve and 27% by weight was retained. The fraction passing through the sieve had a compaction ratio of 3.14, a weight average particle size of 280 microns, and a compacted flow rating of 9.

EXAMPLE 4

The agglomeration of Example 3 was repeated, but at 40°C. All other details of the agglomeration remained the same.

29% by weight of the product was retained on a B.S. 16 mesh sieve. The product passing through the sieve had a compaction ratio of 2.94, a weight average particle size of 300 microns as measured by dry sieving, and a compacted flow rating of 36.

I claim:
1. A process for the preparation of a free-flowing product selected from the group consisting of filled and unfilled agglomerated products,
   from a composition selected from the group consisting of granular polytetrafluoroethylene powders and mixtures of granular polytetrafluoroethylene powder with filler powder, the polytetrafluoroethylene particles in said composition having an air sedimentation size of less than 100 μm,
   said method comprising the steps of:
   i. wetting said composition with an aqueous solution of a protective colloid, the solution containing the protective colloid in an amount of 10 to 10,000 parts by weight of the protective colloid per million parts by weight of water, the solution being used in an amount from 21.5/α to 215/α ml. per 100 gms. of said composition, where α is the true density in gms. cm$^{-3}$ of said composition;
   ii. mechanically agitating the wetted composition to form it into agglomerates; and
   iii. drying the agglomerates to produce an agglomerated product which, when dry, has a compacted flow rating of at least 16 and a compaction ratio of less than 433.

2. The process of claim 1 wherein at least 50% by weight of the dried agglomerates have a dry sieve size in the range 150 to 2000 μm.

3. The process of claim 1 wherein said solution of protective colloid contains 500 to 5000 parts by weight of said protective colloid per million parts by weight of water.

4. The process of claim 1 wherein the temperature at which the step (ii) of mechanical agitation is carried out is 10° to 50°C.

5. The process of claim 1 wherein the amount of said solution of protective colloid used to wet said composition in step (i) is within the range $65/\alpha$ to $130/\alpha$ ml. per 100 grams of said composition.

6. The process of claim 1 wherein the protective colloid is selected from the group consisting of gelatin, partially-hydrolyzed polyvinyl acetate, hydroxymethyl cellulose, hydroxyethyl cellulose, polyethylene oxides, starch, and styrene/maleic anhydride copolymers.

7. The process of claim 1 wherein step (ii) is carried out by tumbling said composition in a blender and wherein step (i) is carried out by adding said solution of protective colloid to said composition while it is tumbled in said blender.

8. The process of claim 1 wherein said agglomerated product is a filled product which contains less than 30% by volume of said filler powder and said filler powder has a density of less than 4 gm. cm$^{-3}$, and wherein step (ii) is carried out at a temperature of from 10° to 40°C.

9. The process of claim 1 wherein said agglomerated product is unfilled and step (ii) is carried out at a temperature of 10° to 40°C.

* * * * *